INVENTOR.
Harold R. Walker
BY
Michael J. Striker
Atty

SUBSCRIPTION TELEVISION COMMUNICATION SYSTEM

INVENTOR.
Harold R. Walker

BY

Michael J. Striker
Atty

SUBSCRIPTION TELEVISION COMMUNICATION SYSTEM

Filed Nov. 15, 1963 Sheet 4 of 5

INVENTOR.
Harold R. Walker

BY

Michael S. Striker
Atty

PULSES FROM MULTIVIBRATOR MODULATED AT 40 CYCLES PER SEC.

INVENTOR.
Harold R. Walker

BY

Michael J. Striker
Atty.

3,439,113

SUBSCRIPTION TELEVISION COMMUNICATION SYSTEM

Harold R. Walker, Metuchen, N.J., assignor to Teleglobe Pay-TV System, Inc., New York, N.Y.

Filed Nov. 15, 1963, Ser. No. 324,009
Int. Cl. H04n 1/44
U.S. Cl. 178—5.1 14 Claims

ABSTRACT OF THE DISCLOSURE

The transmitted signals are coded by setting the front porch portions to a varying gray level, the video signal is polarity inverted, and false horizontal synchronizing signals are provided. The back porch is undisturbed for color information, or replaced by a noise pulse for black and white. Audio may be multiplexed on a key subcarrier the receiver reinverts the video signal and inserts proper sync signals.

The present invention relates to a subscription television communication system. More particularly, the invention relates to a television communication system which provides for secret transmission of video and audio signals.

The principal object of the present invention is to provide a new and improved subscription television system.

An object of the present invention is to provide a subscription television communication system which may be utilized for normal transmission or secret transmission.

An object of the present invention is to provide a subscription television communication system in which the audio signal may be transmitted encoded or unencoded by air or by telephone line.

An object of the present invention is to provide a subscription television communication system of simplicity of structure and components.

An object of the present invention is to provide a subscription television communication system without disruption of normal transmitter or receiver operation.

An object of the present invention is to provide a subscription television communication system which is inexpensive and readily and facilely repaired.

Another object of the present invention is to provide a subscription television communication system which is reliable, effective and efficient in operation.

Still another object of the present invention is to provide a subscription television communication system which invloves simple connection of the encoding and decoding components to existing equipment with a minimum of inconvenience to the user or subscriber and to the transmitting station.

In accordance with the present invention, the subscription television communication system comprises a transmitter for transmitting a video signal. The transmitter includes transmitter audio components for simultaneously transmitting an audio signal of frequency within the audible frequency range synchronized with the video signal. A transmitter encoder strips out the entire horizontal synch pulse and front porch and substitutes periodic white level noise pulses varying in amplitude in accordance with the predetermined function and inverts the polarity of the video signal so as to induce distortion and instability of the picture. The transmitter encoder includes a pulse source for providing noise pulses of a predetermined duration at a predetermined repetition rate, a synch stripper for controlling the pulse source with respect to the horizontal synch signals, a mixer for superimposing the pulses provided by the pulse source on the video signal, and an inverter for inverting the polarity of the video signal provided by the mixer. The transmitter encoder further comprises a synch and front porch gate for removing the entire horizontal synch pulse and front porch, the noise pulses being inserted at the times when the horizontal front porch and synch pulses have been removed. The superimposed pulses center about the gray or mid-level of the video signal after inversion. A receiver decoder receives the video signal and reinverts the polarity of the video signal and inserts the horizontal synch pulses so as to nullify the effect of the encoder and provide an undistorted picture. A receiver receives and reproduces the video signal from the receiver decoder and receives and reproduces the audio signal in synchronism with the video signal.

In order that the present invention may be readily carried into effect, it will now be described with reference to the accompanying drawings wherein.

Figure 2:
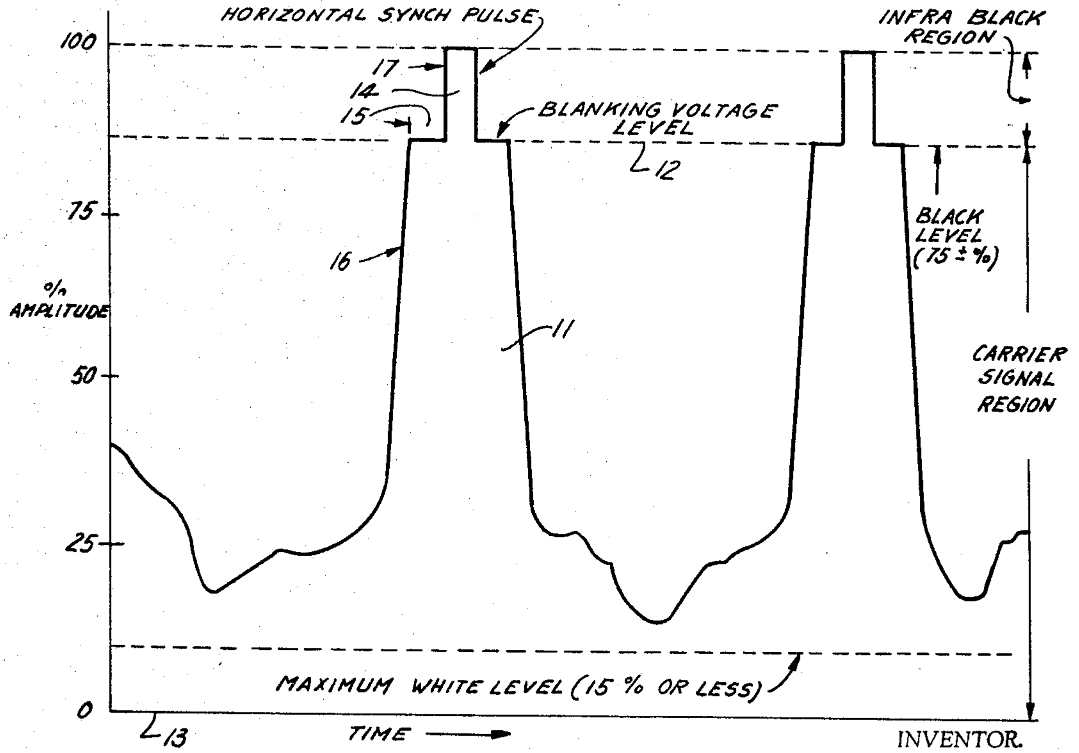
FIG. 2 is a graphical presentation of the details of the modulation envelope of a TV carrier signal clearly indicating the pedestals, the blanking voltage levels, the horizontal synch pulses and the front and back porches.
Figure 3:
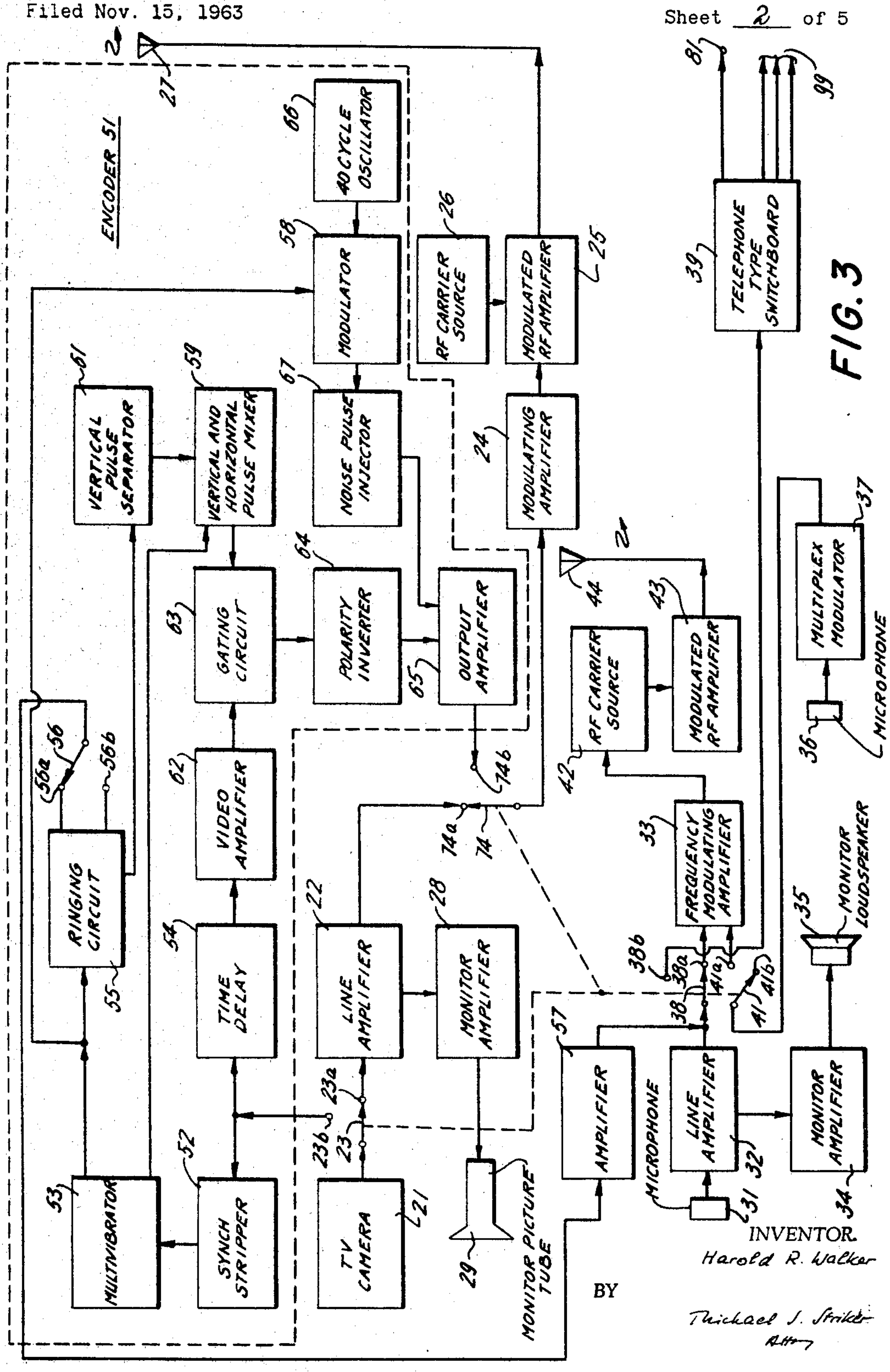
FIG. 3 is a schematic block diagram of an embodiment of a transmitting station of the subscription television communication system of the present invention.
Figure 7:
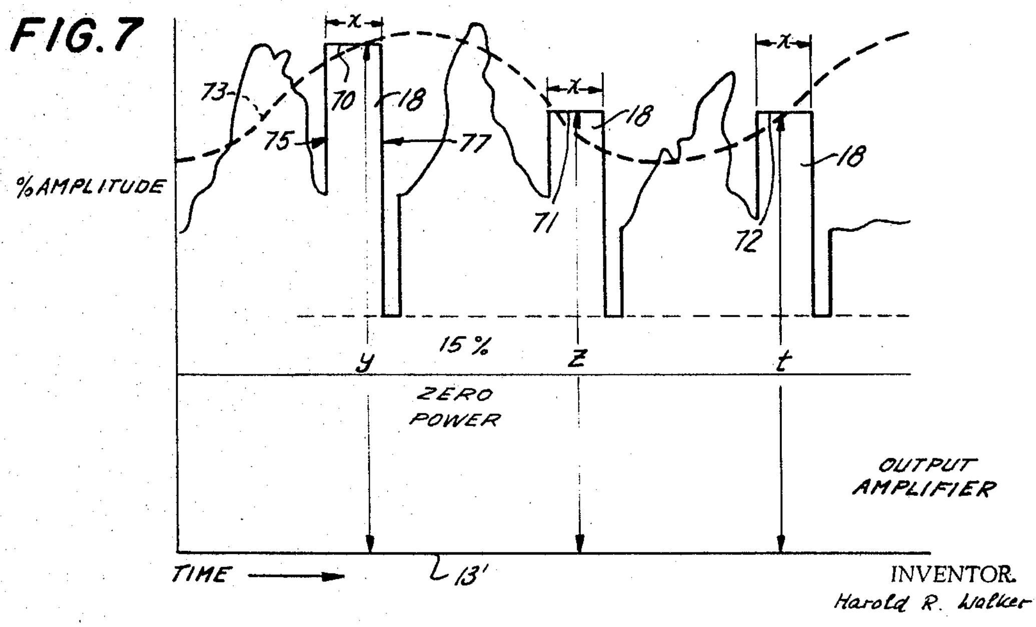

FIGS. 6*a*, 6*b*, 6*c*, 6*d*, 6*e*, 6*f* and 6*g* are graphical presentations of the signals evident at indicated parts of the transmitting station of FIG. 3; and FIG. 7 is a graphical presentation of the details of the modulation envelope of FIG. 2 after the insertion of the noise pulses and after polarity inversion and amplitude modulation.

In the figures, the same components are indicated by the same reference numerals.

Figure 4:
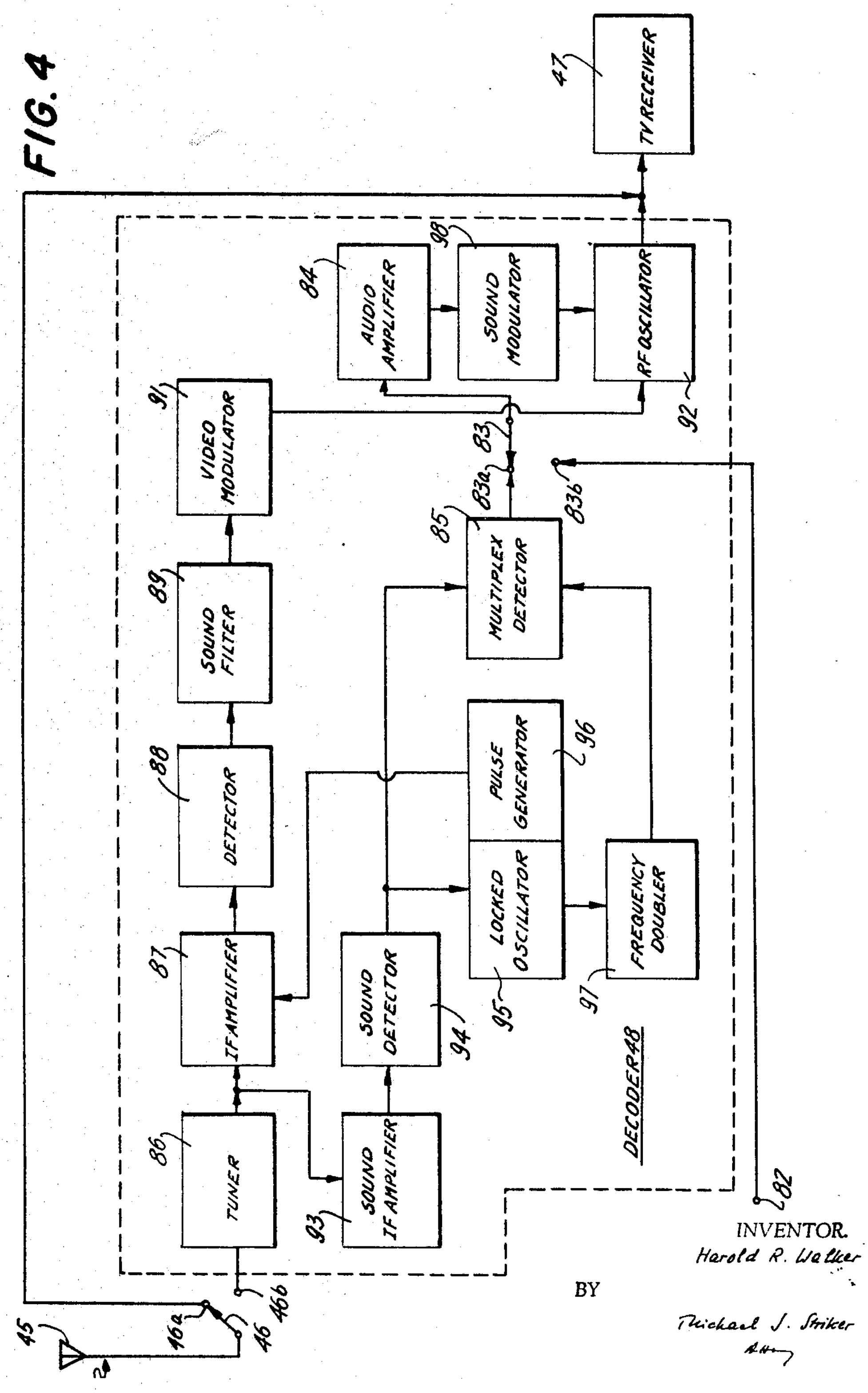
FIG. 4 is a schematic block diagram of an embodiment of a receiving station of the subscription television communication system of the present invention.

The circuitry and/or components of any of the blocks shown in FIGS. 3 and 4 is well known in the art and is shown and described in any suitable textbook on television or communication engineering such as, for example, "Television Engineering Handbook" by Donald G. Fink, McGraw-Hill Book Company, 1957, or "Radio Engineering Handbook" Keith Henney, Editor-in-Chief, fourth edition, McGraw-Hill Book Company, 1950, Chapter 19 on Television by Donald G. Fink, p. 995–1050.

The geometric fidelity of the reproduction of a picture in a TV system depends upon the exact correspondence and position of the scanning spot at a transmitter and receiver. This correspondence requires that the periodicity and phasing of the horizontal and vertical scanning motions at the two termini, i.e. at the transmitter and at the receiver of the television communication system, be alike. Suitable signals are transmitted which indicate the beginning of each frame, or field repetition in the case of interlaced scanning, and the beginning of each line. These synchronized signals are part of the complete video signal and occur during time not utilized by the picture itself, i.e. during the interval in which the scanning spot is returning to its original position after completing a line or field traversal. In terms of the frequency spectrum of the picture signal, the frequency components are multiples of line and frame frequency, phase and amplitude being such that they have no effect on the picture except around the edges where they form a narrow border which cannot be used for the image and which in cathode ray terminal tubes, has no real existence.

Scanning in the case of electronic terminal tubes is produced by deflecting an electron stream periodically in two mutually perpendicular directions by means of suitable varying magnetic or electrostatic fields. The current or voltage producing these fields is supplied from two deflection generators, one operating at line frequency and the other operating at the field frequency. Each generator is controlled by its own synchronizing impluses; therefore, the complete signal must include two types which can be distinguished from one another by some form of selector circuit. It is usual to make the generator producing the synchronizing impulses at the transmitter the fundamental time unit of the entire system. Thus, the synchronizing signal covers not only the scanning pattern at the reproducer but also that at the pickup as well. The exact shape of the impulses for horizontal and vertical synchronizing depends upon how the signal is applied at the deflection generator and upon the circuits which separate the two components. Experience has prompted the almost universal adoption of synchronizing impulses which are "blacker than black," i.e. the blanking level corresponds to black in the video signal and impulses extend below this level in the direction of black.

The transmitted video signal consists of video information plus a plurality of pulses having specific features in regard to time sequence and relative power or voltage amplitude. The Electronic Industry Association Standard has been adopted by the Federal Communications Commission as a standard to be adhered to by all broadcasters. This standard is set forth in documents of the F.C.C. and in standard reference texts and handbooks such as: Television Engineering Handbook by Fink, McGraw-Hill, 1957. The E.I.A. standard may be summed up in brief as follows.

A period of approximately 53 microseconds is allowed for the transmission of video information, followed by a period of approximately 11 microseconds during which all video information is removed. This period known as the "horizontal blanking period" is characterized by a pulse signal structure which is entirely black or blacker than black. Following the blanking period, the video information is again transmitted for 53 microseconds after which the blanking is repeated. After approximately 250 repetitions, the video information is removed for approximately 1,000 microseconds by a "vertical blanking period" followed by another series of line scans consisting of 53 microseconds of video information followed by a horizontal blank period.

Superimposed upon each horizontal blanking pulse is a synchronizing signal consisting of a pulse which is transmitted as a "blacker than black" signal. The exact format of these pulses is described in detail later. Following the synchronizing signal is a short burst of a sine wave used for color synchronization in color receivers. Superimposed upon each vertical blank pulse is a vertical synch pulse of approximately 300 microseconds duration. The horizontal and vertical synch pulses are used to synchronize the receiving apparatus with the camera or picture taking apparatus so that the picture information is displayed in the proper sequence.

In the E.I.A. standard there are also horizontal synchronizing and equalizing pulses superimposed upon the vertical blank pulse. These pulses are not necessary with modern receiving apparatus and are not used in television applications other than commercial broadcasting. They have no bearing on the present invention and a discussion of them is therefore omitted.

In accordance with the present E.I.A. standard, information is transmitted so that the television apparatus scans horizontally 15,750 times each second and vertically 60 times each second. The vertical scan is so timed that it starts each 262.5 horizontal scans (known as a field) and completes one complete picture of 525 lines each two fields, or one frame in 1/30 of a second.

The present invention operates primarily upon the horizontal blanking and synchronizing pedestal which consists of the following if rise and fall times are ignored. Starting at time zero a blanking pulse representing black in the video signal is transmitted at a level representing 75% of peak signal level. This signal continues for 1.27 microseconds creating a period referred to as the "front porch," followed by a rise to 100% signal level for 5.0 microseconds, followed by a return to 75% signal level for a period of 3 to 4 microseconds referred to as the "back porch." Superimposed upon the back porch is a color burst consisting of 8–11 cycles of a color synchronizing signal.

Figure 1:
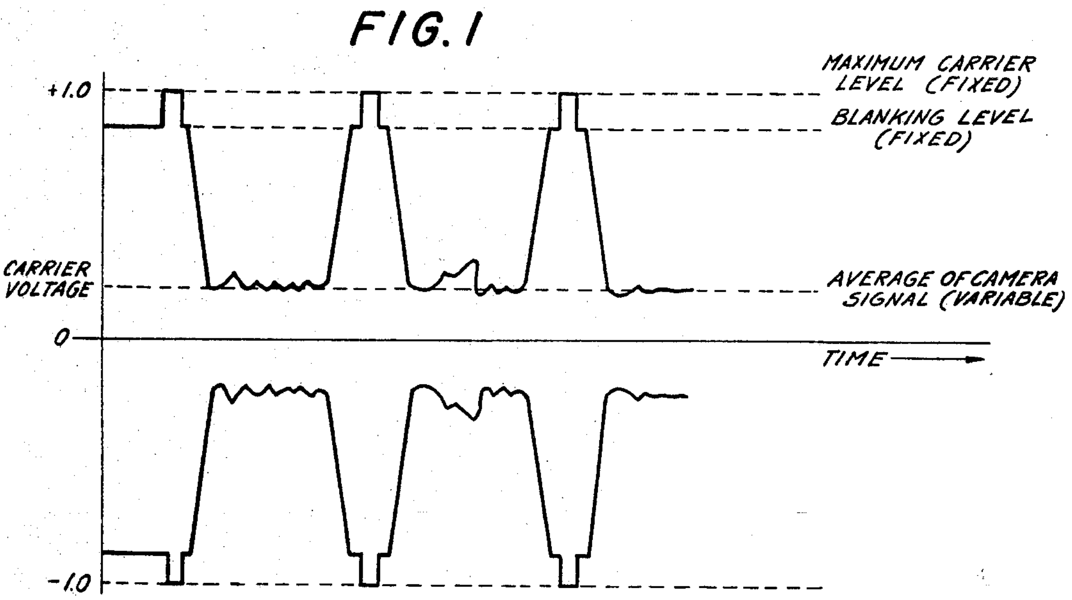
FIG. 1 is a graphical presentation of a modulated TV carrier signal clearly indicating the pedestals and horizontal synch pulses as broadcast in accordance with Electronic Industry Association standards.

The standard form of horizontal synchronizing pulses, blanking voltage level and pedestal is shown in FIGS. 1 and 2. The function of the pedestal is to provide a black level and blanking voltage level. The black level serves as a reference guide for the picture brightness in a normal transmission system and insures that the black portions of the picture are black when the picture is reproduced. The function of the horizontal synch pulses, in a receiving apparatus of modern design, is to provide a guide signal to which the horizontal oscillator may be locked in frequency and phase. The horizontal synch pulse does not trigger the oscillator directly, as does the vertical synch pulse.

The vertical pulses serve the purposes of bringing the eletcron beam back to the top of the screen for the beginning of each field. The structure of the video signal is clearly shown with its synch pulses in FIGS. 1 and 2.

In FIGS. 1 and 2, several lines of an image are shown complete with the detailed information, blanking voltages and horizontal synch pulses. The blanking and synchronizing voltages occupy approximately 15% of the total line sweep time or duration. The blanking voltage retains its control over the cathode ray tube grid for some time before and after each horizontal synchronizing pulse. This is done to make certain that no beam retrace is visible at all on the screen. As soon as the blanking voltage causes the tube to become unblanked, the line detail becomes visible once more. All the lines of one field follow this form, the only difference occurring in the camera detail of the various sections of the image. At the end of the last horizontal line or part thereof, it is necessary to insert a vertical impulse that will bring the beam back to the top of the screen again.

When the video signal is imposed on a carrier wave, the envelope of the modulated carrier wave constitutes the video signal wave form. A modulated picture carrier and the details of the envelope are shown in FIG. 1. In the F.C.C. or E.I.A. standard video signal, as shown in FIGS. 1 and 2, the carrier amplitude is divided by the black level, which is also known as the blanking level or pedestal, at 75 plus or minus 2.5% of the maximum amplitude. The amplitude region above the black level is called the infra-black region and is occupied by the synchronizing signals. Signal levels in this region do not produce light in the receiver image. The synch signals are of three types. These are horizontal signals for insuring the motion of the scanning agent along each horizontal line, vertical signals (as shown in FIGS. 1 and 2) for insuring the motion of the scanning agent vertically at the beginning of each field and a color burst to give color pictures the proper chromatic hue or tone. The peak amplitude of the waves, the height of the synchronizing pulses and the black level amplitude are maintained constant throughout each broadcast. The portion of the carrier involved extending below the black level is called the camera signal. The polarity of transmission in the F.C.C. standard is negative; i.e. an increase in the light on the camera plate results, for example, in a decrease in the carrier amplitude, as shown in FIGS. 1 and 2. The maximum white level is 15% or less of the maximum carrier amplitude. Intermediate gray tones exist between the maximum white level and the maximum black level.

FIG. 2 illustrates the video signal before it is encoded by the transmitter station encoder of the present invention. A pedestal 11 extends to the blanking voltage level 12 at a first predetermined distance, which is the carrier signal region, from a reference level 13. The blanking voltage level 12 is also the black level. A horizontal synch pulse 14 extends from the pedestal 11 to a second predetermined distance from the reference level 13 which is the sum of the carrier signal region and the infrablack region. The horizontal synch pulse 14 has a time duration smaller than the blanking duration of the pedestal so that the blanking voltage level extends a determined front porch distance 15 from the leading edge 16 of the pedestal to the leading edge 17 of the horizontal synch pulse. The duration of the blanking voltage between the trailing edge of the horizontal synch pulse and the trailing edge of the pedestal is the "back porch" distance.

In normal transmission and reception, the picture in the receiver seeks its proper tones or hues of black and white and gray, or the full spectrum of shades, by referring itself to, or hunting with reference to, the black level. The black reference level usually appears as a vertical black band on the screen of the receiver along one of the vertical boundaries of the picture frame. This black level reference band is normally beyond the view of the viewer since it is covered by the coverpiece which fits around the outside of the viewing screen of the receiver tube and acts to bound the actual viewing picture area.

In accordance with the present invention, as illustrated in FIG. 7, variable gray reference signals are provided in place of the front porches and the horizontal synch pulses of the pedestals. The entire or composite picture consisting of picture information plus variable reference signals is broadcast inverted, i.e. white representing peak power. The insertion of the plurality of variable gray to black reference signals 19 of FIG. 6*f* serve to induce distortions of the picture reproduced at the receiver. This is due to the fact that the black reference signals are produced only sporadically and with varying amplitudes, varying in accordance with a modulating function, so that the picture in hunting for its black reference level, attempts to follow any black level in the picture reproduced at the times that the inserted black reference signals or noise signals are not present or are below some black picture information in the video signal.

In other words, if a continuous inserted black reference level were available, the picture reproduced at the receiver would be a normal picture except for the fact that the white and black would be interchanged; i.e., a negative picture would be presented. When a black reference signal is provided sporadically or periodically in place of the horizontal synch pulses, the picture tries to follow the black reference signals when they appear and when black reference signals do not appear, the picture, in hunting for such missing black signals tries to follow whatever black reference signals are in the reproduced picture, thereby creating a grave distortion and shading instability of the reproduced image.

The back porch of the pedestal is not disturbed in a color TV system since the back porch carries the color information. If only black and white is to be transmitted, the back porch may be removed. In such a case the entire pedestal, including the front porch, the horizontal synch pulse and the back porch will be removed and replaced by a noise pulse extending for the same duration in the opposite direction. Each noise pulse in the case of black and white TV would thus be a white reference signal extending from the leading edge of the pedestal to the trailing edge of the pedestal.

The noise pulses are always gray; never black or white. A pulse resulting from gating out the regular horizontal synch pulse would be transmitted black, that is, as a maximum signal for a negative picture, and white for a positive picture. This is so only if no noise is added.

In FIG. 3, a TV camera 21 provides a video signal complete with horizontal and vertical synch signals. During the normal transmission of a normal video signal the system functions as described. The signal produced by the camera 21 is supplied to a line amplifier 22 via a switch arm 23 in the position shown in FIG. 3, for normal picture transmission. That is, in the embodiment of FIG. 3, with the switch arm 23 in the position shown in FIG. 3, the video signal produced by the TV camera 21 is amplified by the line amplifier 22 and is fed to a modulating amplifier 24 which amplifies the signal and feeds the amplified signal to a modulated RF amplifier 25. The signal is then modulated by the modulated RF amplifier on a suitable carrier produced by an RF carrier source 26 and the modulated video signal is then transmitted by means of an antenna 27.

A monitor amplifier 28 produces an output which is fed to a monitor picture tube 29 which reproduces the picture seen by the TV camera 21, which picture is presumably reproduced at the receiver.

A microphone 31 picks up the sound and reproduces an output which is fed to a line amplifier 32. The line amplifier 32 produces an audio signal which is fed to a frequency modulating amplifier 33. The output of the line amplifier 32 is fed to a monitor amplifier 34 which feeds a monitor loudspeaker 35. The monitor loudspeaker 35 reproduces the sound picked up by the microphone 31 which is presumably reproduced by the loudspeaker at the receiver.

A microphone 36 also picks up the sound and produces an output which is fed to a multiplex modulator 37. The multiplex modulator 37 multiplexes, and thereby encodes and renders inaudible, the sound from this source. The output of the line amplifier 32 is fed to a switch arm 38 which may contact a contact 38*a*, and thereby close a circuit with the frequency modulating amplifier 33, or a contact 38*b*, and thereby close a circuit with a telephone type switchboard 39. The output of the multiplex modulator 37 is fed to a switch arm 41 which may contact a contact 41*a*, and thereby close a circuit with the frequency modulating amplifier 33, or a contact 41*b* and thereby open its circuit.

The frequency modulating amplifier 33 produces an audio signal which is fed to an RF carrier source 42 which produces a carrier which is modulated with the audio signal from the frequency modulating amplifier 33 and feeds the modulated carrier to a modulated RF amplifier 43. The modulated audio signal is then transmitted through an antenna 44. The line amplifier 32 is connected to the frequency modulating amplifier 33 through the switch arm 38 which, during normal transmission, is preferably in the position shown in FIG. 3, thereby permitting said line amplifier to be directly connected to said frequency modulating amplifier so that the audio signal is transmitted through the antenna 44.

The video signal transmitted by the antenna 27 of the transmitting station and the audio signal transmitted by the antenna 44 of the transmitting station are received by an antenna 45 of the receiving station of FIG. 4. A switch arm 46 is in the position shown in FIG. 4 during normal transmission and reception. When the switch arm 46 contacts a contact 46*a* it connects the antenna 45 directly to the subscriber's receiver 47 and when said switch arm contacts a contact 46*b*, it connects the antenna 45 to the TV receiver 47 through a decoder 48. It is thus seen that the decoder 48 may be connected between the antenna 45 and the intact receiver set of the subscriber without difficulty.

Thus, during normal or non-subscription operation of the subscription television communication system of the present invention, a video signal of the usual type and an audio signal of the usual type are produced in the usual manner, transmitted in the usual manner and received and reproduced in the usual manner, so that during normal operation of the subscription television communication system of the present invention a normal TV transmission and reproduction occurs.

The subscription television communication system of the present invention is, however, especially adapted for use as a confidential or closed type system. The subscription television communication system of the present invention is also adapted for home subscriber programming, and in order to provide such operation the switch arms at the transmitting station and the switch arm at the receiving station must be operated.

If a closed-type or a subscriber type television system is required, wherein a subscriber wishes to receive a program which is not available to non-subscribers, the subscriber may indicate his wishes by phone call or by other suitable means such as, for example, a receptacle for coins, tokens, punched cards, etc. The means for payment of the subscription may be any suitable means and may also be utilized to notify the transmitting station that the subscriber is ready to receive the special program. In accordance with the present invention, a selected subscriber, who may be one of several hundreds of thousands of subscribers and who wishes to view special programs on occasion, is connected and/or has his TV receiver connected by telephone tie lines directly to the telephone type switchboard 39 shown in schematic form in FIG. 3. The switchboard 39 preferably comprises an automatic telephone type switchboard such as is manufactured by the General Telephone Company and which functions to provide desired line connections at desired times in the manner of automatic switchboards. Thus, if a subscriber wishes to receive a special program for which he will pay or be billed, he has merely to call in a signal to the switchboard 39 or to close a suitable manual switch such as, for example, the switch arm 46, which is then moved to contact its contact 46*b*, in the position other than that shown in FIG. 4, at his TV receiver set to alert the switchboard that such reception is desired.

The subscriber may, of course, indicate in some other suitable manner that he is desirous of receiving a subscription program. The operation of the switch arrangement 23, 38, 41, 74 at the transmitting station insures that the subscribers receive the program transmitted on a closed circuit basis. Although the switch arms 23, 38, 41 and 74 may be ganged together, they need not be, so that the sound may be transmitted as desired either with or without encoding from the transmitting station by air or by wire regardless of the type of transmission of the picture signal. In a preferred embodiment of the subscription television communication system of the present invention, however, the sound is transmitted either encoded on a multiplex sound carrier, or transmitted by wire when the picture is transmitted in secret. Thus, when a special program is to be transmitted, the transmitter control operation will initiate the transmitter switch arms 23, 38, 41, 74. The switchboard 39 is aware of the fact that identified subscribers are ready to receive a special subscription program and have paid their required subscription fees or have accordingly been billed in suitable manner, since it has been alerted by signals from the subscribers' receivers. Such alerting signals may be provided by coin receiving means or punched card means available at the receiver of the subscriber. When the special program is to be transmitted, the operator of the transmitting station operates the switch arms to move the first switch arm 23 out of contact with its contact 23*a* and into contact with its contact 23*b* and to move a fourth switch arm 74 out of contact with its contact 74*a* and into contact with its contact 74*b* and thereby institute the closed circuit secret subscription television communication system in accordance with the objective of the present invention. The operator moves the second switch arm 38 to contact its contact 38*b*. If the audio is to be transmitted to the subscriber via telephone line and the operator moves the third switch arm 41 to contact its contact 41*a* if audio encoded by being modulated on a multiplex sound carrier is to be transmitted by air to the subscriber.

Figure 6A:
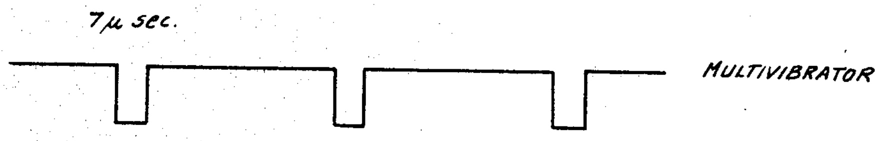

Thus, when the switch arm 23 is moved to contact its contact 23*b* and the switch arm 74 is moved to contact its contact 74*b*, an encoder 51 is inserted into the circuit arrangement between the TV camera 21 and the modulating amplifier 24. The video signal provided by the TV camera 21 is supplied in the encoder 51, to a synch stripper 52 which removes all the information of the video signal except the synch pulses. The synch pulses from the synch stripper 52 are fed to a multivibrator 53. The video signal from the TV camera 21 is also fed to a time delay 54. The signals fed to the multivibrator 53 operate said multivibrator and cause it to produce periodic pulses which are transmitted to a ringing circuit 55. The multivibrator 53 produces pulses having a duration of approximately seven microseconds, as shown in FIG. 6*a*.

Figure 6B:
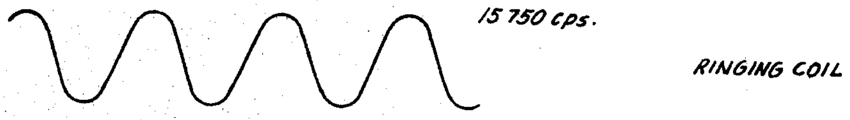

The pulses produced by the multivibrator 53 trigger the ringing circuit 55, which functions to produce a ringing or key signal of approximately 15,750 cycles per second which is derived at the output terminals 56*a* or 56*b* of said ringing circuit via a switch arm 56 which feeds said key signal to an amplifier 57. The key signal available at the output terminal 56*a* of the ringing circuit 55 is in a determined phase such as, for example, zero degrees, whereas the key signal at the output terminal 56*b* of the ringing circuit 55 is in the opposite phase such as, for example, 180 degrees. The amplified key signal produced by the amplifier 57 is fed to the frequency modulating amplifier 33 via the switch arm 38. The key signal, which is a sinusoidal function as illustrated in FIG. 6*b*, is transmitted along with the audio signal via the antenna 44, or if desired via the telephone lines.

Figure 6C:
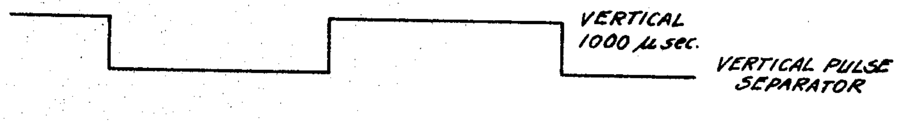

The pulses produced by the multivibrator 53 are also supplied to a modulator 58 and to a vertical and horizontal pulse mixer 59. The key signal produced by the ringing circuit 55 is also supplied to a vertical pulse separator 61. The vertical pulse separator 61 derives vertical blanking pulses, as illustrated in FIG. 6*c*, from the key signal and feeds said vertical blanking pulses to the vertical and horizontal pulse mixer 59. Each of the vertical blanking pulses produced by the vertical pulse separator 61 has a duration of approximately 1000 microseconds.

Figure 6D:

The vertical and horizontal pulse mixer 59 combines the pulses produced by the multivibrator 53 with the vertical blanking pulses produced by the vertical pulse separator 61 to produce a resultant signal, as illustrated in FIG. 6*d*, including the vertical pulses represented by the output of the vertical pulse separator 61 and horizontal pulses represented by the output of the multivibrator 53.

The video signal produced by the TV camera 21 is also fed through the time delay 54 to a video amplifier 62. The time delay 54 is adjusted to delay the video signal in amounts sufficient to enable the pulses from the multivibrator 53 and the vertical pulse separator 61 to be superimposed thereon in the duration occupied by the horizontal synch pulse and front porch. The delay time of the time delay 54 is approximately 1.6 microseconds. The amplified video signal produced by the video amplifier 62 is supplied to a gating circuit 63 which removes the horizontal synch pulse and front porch from the time delayed, amplified video signal.

Figure 6E:
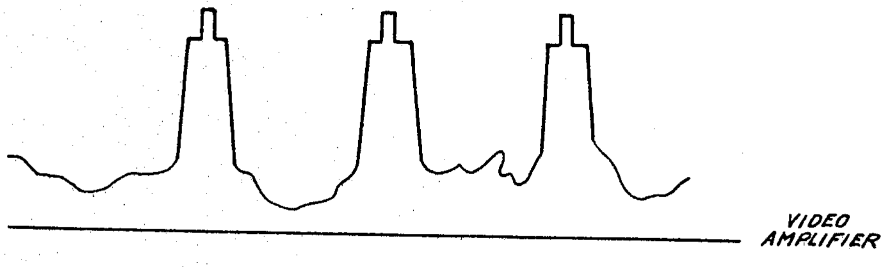

The vertical and horizontal pulse signal produced by the vertical and horizontal pulse mixer 59 is superimposed upon the signal produced by the gate circuit 63. The signal at the output of the video amplifier 62 is merely a time delayed video signal and is illustrated in FIG. 6e.

Figure 5:
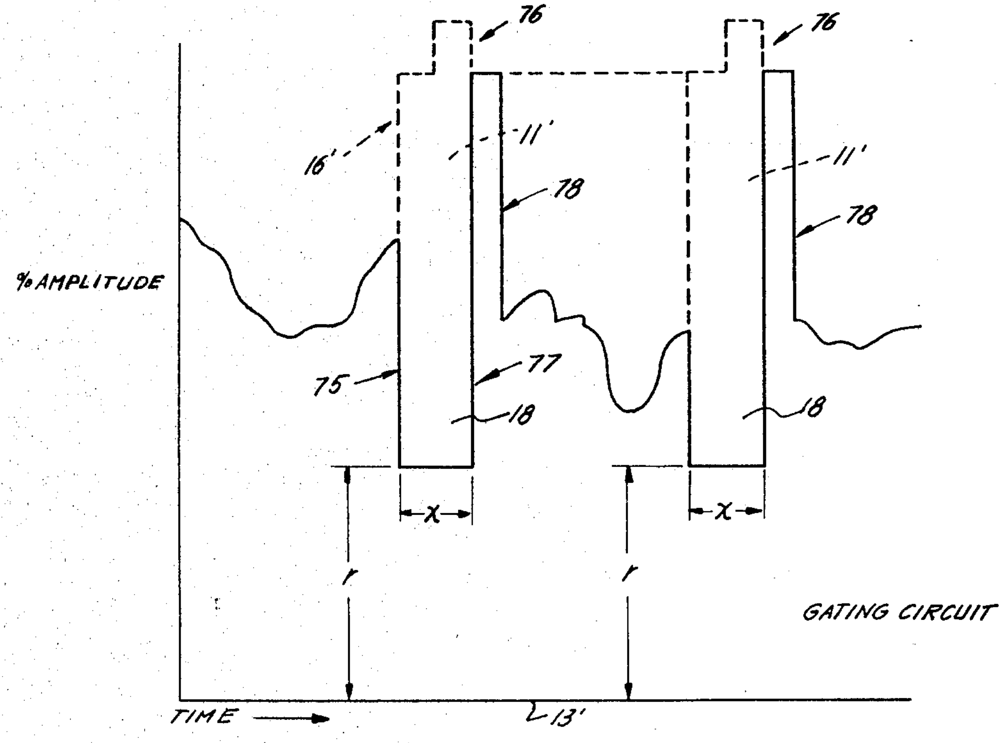
FIG. 5 is a graphical presentation of the details of the modulation envelope of FIG. 2 after the insertion of the noise pulses and before polarity inversion and amplitude modulation and also illustrates the signal produced by the detector component of the decoder of the receiving station.
Figure 6F:
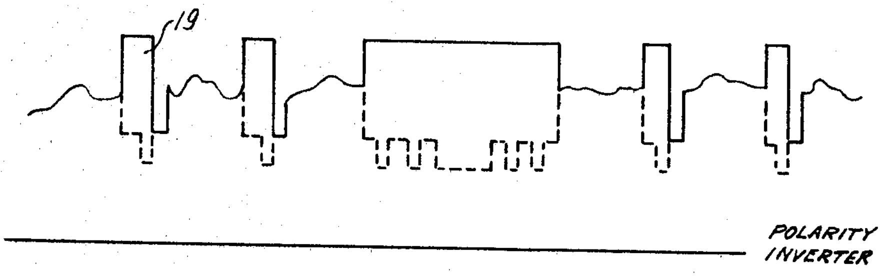

The signal comprising the video information plus the vertical and horizontal replacement pulses produced by the gating circuit 63 after combination with the vertical and horizontal pulse signal produced by the vertical and horizontal pulse mixer 59, illustrated in FIG. 5, is fed to a polarity inverter 64. The polarity inverter 64 inverts the polarity of the signal fed to it from the gating circuit 63 to produce a signal, as illustrated in FIG. 6f, which includes the vertical replacement pulses and the horizontal replacement pulses which are inverted and, therefore, are black level signals. The output signal of the inverter 64 is fed to an output amplifier 65. The horizontal replacement pulses of the signal produced by the polarity inverter 64 have a substantially constant amplitude, as illustrated in FIG. 6f.

Figure 6G:
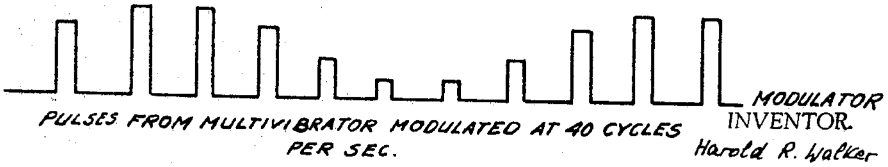

The amplitudes of the horizontal replacement pulses of the inverted video signal are varied in accordance with a 40 cycle per second sinusoidal function by a noise pulse injector 67 prior to transmission in a preferred embodiment of the invention, although other waveshapes and frequencies may be used. The pulses produced by the multivibrator 53 are modulated in amplitude in the modulator 58 in accordance with a 40 cycle per second sinusoidal function produced by a 40 cycle oscillator 66. The amplitude-modulated noise pulses are fed to the noise pulse injector 67 from the modulator 58. The noise pulse injector 67 supplies the amplitude-modulated noise pulses to the output amplifier 65 which then combines the signals produced by the polarity inverter 64 with the amplitude-modulated noise pulses. The amplitude-modulated noise pulses are illustrated in FIG. 6g, as they are derived from the modulator 58.

The output of the output amplifier 65 is illustrated in FIG. 7. The variable reference noise pulses have the same pulse duration $x$ as the gate pulse 18. The amplitude of each variable reference pulse varies in accordance with the 40 cycle per second sinusoidal function of the oscillator 66 so that when the entire video signal is viewed after noise pulse injection, the amplitudes of the variable reference levels vary as shown in FIG. 6g. Therefore, assuming that the first variable reference level or noise pulse corresponding in line with the gate pulse 18 in FIG. 7 is at the beginning of the sinusoidal function, the distance of the highest portion 70 of said first noise pulse from the reference level 13' is greater than the corresponding distance of the second noise pulse. Thus, the portion 70 of the first noise pulse is spaced a distance $y$ from the reference level of 13', the portion 71 of the second noise pulse is spaced a distance $z$ from said reference level and the portion 72 of the third noise pulse is spaced a distance $t$ from the said reference level in accordance with a sinusoidal function. The sinusoidal function 73 is indicated in broken lines in FIG. 7.

The output of the output amplifier 65 is supplied to the terminal 74b and is fed to the modulating amplifier 24 via the fourth switch arm 74 which may be ganged to the first, second and third switch arms 23, 38 and 41, respectively, so that when the encoder 51 is connected into the circuit via the switch arm 23 and its contact 23b the output amplifier 65 is connected into the circuit via the switch arm 74 and its contact 74b. During normal or non-subscription transmission, of course, the switch arm 74 contacts its contact 74a as shown in FIG. 3.

The output signal of the output amplifier 65 thus comprises black level signals having amplitudes varying in accordance with a predetermined sinusoidal function which induces distortion of the television picture by inducing violent side to side motion as the non-subscriber's receiver hunts between the strongest, maximum amplitude portions of the signal. The video signal transmitted via the transmitter antenna 27, if received by a receiver not equipped with the decoder of the present invention, will thus create violent picture distortions through scrambling induced by violent side to side motion of the picture. Since the noise pulses are merely periodic or sporadic in occurrence in that they replace the horizontal synch pulses and front when they are present, the picture seeks to follow them and when they are absent, the receiver synch circuit still tries to lock on or follow the then missing synch pulse and in so doing locks on the blackest part of the picture, thus causing violent scrambling and distortion.

As shown in FIG. 5, which illustrates the signal produced by the gating circuit 63, the first part of the pedestal 11' is removed and is replaced by the gating signal 18 from the vertical and horizontal pulse mixer 59. The removed portion of the pedestal has a leading edge 16' coincident with the leading edge 75 of the gating pulse and a trailing edge 76 coincident with the trailing edge 77 of the corresponding gating pulse 18. The blanking voltage extends normally for the duration of the pedestal 11' from its leading edge 16' to its trailing edge 78, and in the system in which the noise pulse is superimposed upon the video signal after the horizontal synch signal is removed, the blanking voltage is removed except for the back porch area which contains the color burst in color TV systems.

In the graphical presentation of FIG. 5, the gating pulse 18 is a white level signal. The output of the polarity inverter 64, however, as shown in FIG. 6f, provides variable gray to black level pulses 19, as hereinbefore described.

The sound or audio signals may be transmitted as desired by the operator of the transmitting station, via air as encoded or unencoded sound or via telephone line. If it is desired to maintain the sound for the subscription program secret, the switch arm 38 may be moved to contact its contact 38b, or the switch arm 41 may be moved to contact its contact 41a upon transmission of a subscription program. When the switch arm 38 is moved to contact its contact 38b, it feeds the output of the line amplifier 32 into the telephone lines leading to the subscriber's audio receivers via the telephone type switchboard 39. The audio signal then appears at the audio terminal 81 of the transmitting station and is received at the audio terminal 82 of the receiving station, whence it is supplied through a switch arm 83 of the receiver, when said switch arm contacts its contact 83b, to an audio amplifier 84 of the subscriber's decoder 48. Thus, during transmission of the closed circuit program all the audio may be transmitted directly by wire, if so desired, so that it cannot be received by non-subscribing receivers and the picture is distorted so that it cannot be reproduced by non-subscribing receivers.

If it is desired to maintain the sound for the subscription program secret, the entire transmission may be via the air if the switch arm 41 is moved to contact its contact 41a upon transmission of a subscription program. When the switch arm 41 is moved to contact its contact 41a, it feeds the sound, modulated on a multiplex sound carrier, from the multiplex modulator 37 to the frequency modulating amplifier 33 whence it is transmitted encoded, since it is modulated on a multiplex sound carrier, to the antenna 45 of the subscriber's receiver. The audio signal, modulated on a multiplex sound carrier, is then detected by a multiplex detector 85 of the decoder 48.

The receiving station of FIG. 4 includes the decoder 48. The decoder 48 comprises a tuner 86 connected to the receiving antenna 45 via the switch arm 46, an IF amplifier 87 connected to the output of the tuner 86 and a detector 88 connected between the output of the IF amplifier 87 and the input of a sound filter 89. The sound filter 89 filters out the audio carrier which could cause interference, and transmits the video signal to a video modulator 91 which modulates the video signal on a suitable carrier supplied by an RF oscillator 92. The video detector 88 functions to reinvert the polarity of the video signal so that the video signal has the proper polarity.

The audio signal has the 15,750 cycles per second key signal subcarrier on it plus a multiplex sound carrier such as a suppressed carrier sound channel based on a 31,500 cycles per second or a 23,625 cycles per second carrier which is frequency or amplitude modulated and which is the basis for the multiplex modulation of the audio signal. These frequencies are related to the 15,750 cycles per second key signal so no beat audio is caused. If any beat audio were evident, it could be filtered out. The signal derived from the tuner 86 is supplied to a sound IF amplifier 93. A sound detector 94 is connected between the outut of the sound IF amplifier 93 and the input of the multiplex detector 85. The output of the sound detector 94 is also connected to the input of a locked oscillator 95 which drives a pulse generator 96 which feeds pulses to the IF amplifier 87. In the case of 31,500 cycles per second suppressed carrier sound, the locked oscillator 95 feeds its output to a frequency doubler 97 which supplies its output to the multiplex detector 85.

The sound derived from the received signal by the sound detector 94 locks the locked oscillator 95 at the key frequency of 15,750 cycles per second. The oscillator 95 generates pulses of the same width or duration as the noise pulses 19 received from the transmitter with the video signal. The pulse generator 96, since it is driven by the locked oscillator 95 at 15,750 cycles per second, generates pulses of the duration of the noise pulses superimposed on the video signal and therefore, by proper phase adjustment, the pulses produced by said pulse generator and fed to the IF amplifier 87 overlap and eliminate the noise pulses present in the received video signal. At the same time, the elimination of the noise pulses 19 from the video signal in the IF amplifier 87 restores the initial horizontal synch pulses minus the unimportant front porch so that the video signal produced by the IF amplifier 87 is an acceptable video signal to the subscriber's receiver. The phase adjustment insures that the pulses produced by the pulse generator 96 occur at the same times as the noise pulses in the video signal in the IF amplifier 87 so that the noise pulses are eliminated or cancelled out. The detector 88 then detects the resultant video signal and retransmits it to the subscriber's receiver 47 via the video modulator 91 and the RF oscillator 92.

If a 31,500 cycles per second multiplex carrier is utilized, the received key signal of 15,750 cycles per second is doubled in a frequency doubler 97 and is reinserted in the suppressed carrier or multiplex detector 85. If another carrier such as, for example, a 23,625 cycles per second carrier is utilized, a simple band pass circuit and diode are utilized or a synchrodyne or an FM discriminator may be utilized instead of the filter and detector. The detected sound or audio signal is supplied from the multiplex detector 85 to the audio amplifier 84 through the switch arm 83 when it contacts its contact 83*a*. The audio amplifier 84 supplies the audio signal to a sound modulator 98 which then provides an audio modulated carrier signal to the RF oscillator 92.

When the subscriber indicates his intention to subscribe to a subscription program, he provides for the moving of the switch arm 46 to contact its contact 46*b*. The subscriber also provides for the moving of the switch arm 83 to contact either its contact 83*b* or its contact 83*a*, depending upon whether he will receive the audio portion of the subscription program via telephone line or multiplex carrier. This is accomplished either by a suitable paying mechanism at his receiver which receives either coins or some type of card or other indicia of payment, or he provides for closing of the switch arm by indirect means at a central station such as the switchboard 39 and such central station then returns the signal to cause the switch arm 46 to contact its contact 46*b* by any suitable means such as, for example, by the energization or deenergization of a solenoid.

When the switch arm 46 contacts its contact 46*b*, the video signal of FIG. 6*f* is received by the decoder 48 along with the audio signal either unencoded or encoded by being modulated on a multiplex sound carrier. The tuner 86, IF amplifier 87 and detector 88 serve their normal functions, so that in detecting the video signal, said video signal is reinverted and the black level noise pulses 19 are eliminated with the assistance of the pulse generator 96.

The video output of the detector 88 and the multiplex detector 85 modulate a new carrier supplied by the RF oscillator 92 which supplies the newly modulated signal to the TV receiver 47 of the subscriber. The video output of the detector 88 could, of course, be supplied directly to the video amplifier stage of the subscriber's TV receiver 47, but is not, in order to maintain the subscriber's receiver intact. The video signal thus received by the TV receiver 47 is essentially that of FIG. 6*e*.

The audio signal received by the antenna 45, after passing through the tuner 86, the sound IF amplifier 93, the sound detector 94 and the multiplex detector 85, modulates a secret audio signal carrier with the derived audio signal from the multiplex detector 85 in the audio amplifier 84 and the sound modulator 98 to produce the resultant audio signal which is supplied with the resultant video signal from the video modulator 91 to the RF oscillator 92 and thence to the receiver 47.

It is thus seen that the subscription television system of the present invention provides security for video and audio transmission to subscribers. Although, for purposes of clarity of illustration and clarity of disclosure, a single receiving station is indicated in FIG. 4, a plurality of receiving stations may of course be connected to a transmission station through the telephone type switchboard 39, as indicated by the extra telephone lines 99 of FIG. 3. Each of the receiving stations may comprise the receiving means indicated in FIG. 4. Several hundred thousand receiving stations may be included in the system; these stations being accommodated through the automatic switchboard or banks of switchboards.

It is thus seen that the transmitting station is not disrupted from its normal operation due to the utilization of the switch arm arrangement 23, 38, 41, 74 for either connecting or disconnecting the encoder 51 and the sound from the normal circuitry and that the receiving stations are not disrupted from normal operation due to the utilization of the switch arm arrangement 46, 83 for connecting or disconnecting the decoder 48 and the sound into the receiver circuitry. The transmitting and receiving means do not require major reconstruction to enable the transmission and reception of subscription programs, and neither the owners of the TV sets nor the transmission station operators are inconvenienced by the structure or operation of the encoder and decoder of the subscription system. The modifications of existing equipment required for the subscription telephone communication system are minor ones and include readily installable standard type equipment.

The utilization of telephone lines during the subscription transmission or the encoding of the sound by multiplex modulation if desired, makes use of the subscription television communication system of the present invention exceedingly simple, as well as reliable and efficient in operation, and permits direct communication with each subscriber through a central station such as indicated by the switchboard 39. The switchboard 39 and the telephone lines are parts of the subscription television communication system which may already be in existence and which may be leased or purchased or utilized in the closed circuit TV system of the present invention.

While the invention has been described by means of specific examples and in specific embodiments, I do not wish to be limited thereto, for obvious modifications will occur to those skilled in the art without departing from the spirit and scope of the invention.

What I claim is:

1. In a television system, in combination, transmitting means for transmitting a video signal, said transmitting means including transmitter audio means for simultaneously transmitting an audio signal of a frequency within the audible frequency range synchronized with said video signal;

transmitter encoding means for providing periodic gray level signals having amplitudes varying in accordance with a predetermined function at selected portions of said video signal so as to induce distortion of the picture;

receiver decoding means for receiving said video signal and for converting said gray level signals to white level signals so as to nullify the effect of said encoding means and provide an undistorted picture; and receiving means for receiving and reproducing the video signal from said receiver decoding means and for receiving and reproducing said audio signal in synchronism with said video signal.

2. In a television system, in combination, transmitting means for transmitting a video signal, said transmitting means including transmitter audio means for simultaneously transmitting an audio signal of a frequency within the audible frequency range synchronized with said video signal;

transmitter encoding means for providing periodic gray level signals having amplitudes varying in accordance with a predetermined function at selected portions of said video signal and for inverting the polarity of said video signal so as to induce distortion of the picture;

receiver decoding means for receiving said video signal and for reinverting the polarity of said video signal so as to change said grey level signals to white level signals and nullify the effect of said encoding means and provide an undistorted picture; and receiving means for receiving and reproducing the video signal from said receiver decoding means and for receiving and reproducing said audio signal in synchronism with said video signal.

3. In a television system, in combination, transmitting means for transmitting a video signal, said video signal having a plurality of pedestals each having a leading edge, a trailing edge and a blanking voltage level at a first predetermined amplitude from a reference level and horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing porch and horizontal synch pulse of each of the pedestals of said video signal with a gray level signal so as to induce distortion of the picture;

receiver decoding means for receiving said video signal and for converting said gray level signals to white level signals and for reinserting horizontal synch signals so as to nullify the effect of said encoding means and provide an undistorted picture; and receiving means for receiving and reproducing the video signal from said receiver decoding means and for receiving and reproducing said audio signal in syncronism with said video signal.

4. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a gray level signal and for inverting the polarity of said video signal so as to induce distortion of the picture;

receiver decoding means for receiving said video signal and for reinverting the polarity of said video signal so as to change said gray level signals to white level signals and for reinserting horizontal synch signals so as to nullify the effect of said encoding means and provide an undistorted picture; and receiving means for receiving and reproducing the video signal from said receiver decoding means and for receiving and reproducing said audio signal in synchronism with said video signal.

5. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture;

receiver decoding means for receiving said video signal and for reinverting the polarity of said video signal and for reinserting horizontal synch signals so as to nullify the effect of said encoding means and provide an undistorted picture; and receiving means for receiving and reproducing the video signal from said receiver decoding means and for receiving and reproducing said audio signal in synchronism with said video signal.

6. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including gating means for removing the front porch and horizontal synch pulse of each of the pedestals of said video signal, pulse means for providing pulses of a predetermined duration and a predetermined amplitude, mixing means for superimposing pulses provided by said pulse means on said video signal in place of the removed front porches and horizontal synch pulses of the pedestals, inverting means for inverting the polarity of the video signal provided by said mixing means, and modulating means for varying the amplitudes of said pulses in accordance with a predetermined function;

receiver decoding means for receiving said video signal and for reinverting the polarity of said video signal and for reinserting horizontal synch signals so as to nullify the effect of said encoding means and provide an undistorted picture; and receiving means for receiving and reproducing the video signal from said receiver decoding means and for receiving and reproducing said audio signal in synchronism with said video signal.

7. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including gating means for removing the front porch and horizontal synch pulse of each of the pedestals of said video signal, pulse means for providing pulses of a predetermined constant amplitude each extending for a duration from the leading edge of a pedestal to the trailing edge of its horizontal synch pulse, mixing means for superimposing pulses provided by said pulse means on said video signal in place of the removed front porches and horizontal synch pulses of the pedestals, inverting means for inverting the polarity of the video signal provided by said mixing means, and modulating means for varying the amplitudes of said pulses in accordance with a sinusoidal function of predetermined frequency;

receiver decoding means for receiving said video signal and for reinverting the polarity of said video signal and for reinserting horizontal synch signals so as to nullify the effect of said encoding means and provide an undistorted picture; and receiving means for receiving and reproducing the video signal from said receiver decoding means and for receiving and reproducing said audio signal in synchronism with said video signal.

8. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including gating means for removing the front porch and horizontal synch pulse of each of the pedestals of said video signal, pulse means for providing pulses of a predetermined constant amplitude each extending for a duration from the leading edge of a pedestal to the trailing edge of its horizontal synch pulse, mixing means for superimposing pulses provided by said pulse means on said video signal in place of the removed front porches and horizontal synch pulses of the pedestals, each of said last-mentioned pulses extending toward the reference level of said video signal, inverting means for inverting the polarity of the video signal provided by said mixing means, and modulating means for varying the amplitudes of said pulses in accordance with a sinusoidal function of predetermined frequency;

receiver decoding means for receiving said video signal, and for reinverting the polarity of said video signal and for reinserting horizontal synch signals so as to nullify the effect of said encoding means and provide an undistorted picture; and receiving means for receiving and reproducing the video signal from said receiver decoding means and for receiving and reproducing said audio signal in synchronism with said video signal.

9. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including synch stripper means for removing each of the horizontal synch pulses of said video signal, pulse means controlled by the horizontal synch pulses removed by said synch stripper means for providing pulses of a predetermined duration and a predetermined amplitude, gating means for removing the front porch and horizontal signal pulse of each of the pedestals of said video signal, mixing means for superimposing pulses provided by said pulse means on said video signal in place of the removed front porches and horizontal signal pulses of the pedestals, inverting means for inverting the polarity of the video signal provided by said mixing means, and modulating means for varying the amplitudes of said pulses in accordance with a predetermined function;

receiver decoding means for receiving said video signal and for reinverting the polarity of said video signal and for reinserting horizontal synch signals so as to nullify the effect of said encoding means and provide an undistorted picture; and receiving means for receiving and reproducing the video signal from said receiver decoding means and for receiving and reproducing said audio signal in synchronism with said video signal.

10. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including gating means for removing the front porch and horizontal synch pulse of each of the pedestals of said video signal, pulse means for providing pulses of a predetermined constant amplitude each extending for a duration from the leading edge of a pedestal to the trailing edge of its horizontal synch pulse, mixing means for superimposing pulses provided by said pulse means on said video signal in place of the removed front porches and horizontal synch pulses of the pedestals, each of said last-mentioned pulses extending toward the reference level of said video signal, inverting means for inverting the polarity of the video signal provided by said mixing means, and modulating means for varying the amplitudes of said pulses in accordance with a sinusoidal function of predetermined frequency;

receiver decoding means for receiving said video signal and for reinverting the polarity of said video signal and for reinserting horizontal synch signals so as to nullify the effect of said encoding means and provide an undistorted picture, said receiver decoding means comprising detecting means for detecting and inverting said video signal, and receiving means for receiving and reproducing the video signal from said receiver decoding means and for receiving and reproducing said audio signal in synchronism with said video signal.

11. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including gating means for removing the front porch and horizontal synch pulse of each of the pedestals of said video signal, pulse means for providing pulses of a predetermined duration and a predetermined amplitude, mixing means for superimposing pulses provided by said pulse means on said video signal in place of the removed front porches and horizontal synch pulses of the pedestals, inverting means for inverting the polarity of the video signal provided by said mixing means, and modulating means for varying the amplitudes of said pulses in accordance with a predetermined function;

receiver decoding means for receiving said video signal and for reinverting the polarity of said video signal and for reinserting horizontal synch signals so as to nullify the effect of said encoding means and provide an undistorted picture, said receiver decoding means comprising means for deriving said video signal and said audio signal from the received signal, means for reinserting horizontal synch pulses in the derived video signal, means for inverting said video signal to nullify the effect of said encoding means, means for modulating the derived inverted video signal on a video carrier, means for modulating the derived audio signal on an audio carrier, and means for combining the modulated derived inverted video signal and the modulated derived audio signal to provide a resultant signal; and receiving means for receiving and reproducing the video signal from the resultant signal provided by said receiver decoding means and for receiving and reproducing said audio signal from the resultant signal provided by said receiver decoding means in synchronism with said video signal.

12. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture, said transmitter encoding means including gating means for removing the front porch and horizontal synch pulse of each of the pedestals of said video signal, pulse means for providing pulses of a predetermined constant amplitude each extending for a duration from the leading edge of a pedestal to the trailing edge of its horizontal synch pulse, mixing means for superimposing pulses provided by said pulse means on said video signal in place of the removed front porches and horizontal synch pulses of the pedestals, each of said last-mentioned pulses extending toward the reference level of said video signal, inverting means for inverting the polarity of the video signal provided by said mixing means, and modulating means for varying the amplitudes of said pulses in accordance with a sinusoidal function of predetermined frequency;

receiver decoding means for receiving said video signal and for reinverting the polarity of said video signal and for reinserting horizontal synch signals so as to nullify the effect of said encoding means and provide an undistorted picture, said receiver decoding means comprising means for deriving said video signal and said audio signal from the received signal, means for reinserting horizontal synch pulses in the derived video signal, means for inverting said video signal to nullify the effect of said encoding means, means for modulating the derived inverted video signal on a video carrier, means for modulating the derived audio signal on an audio carrier, and means for combining the modulated derived inverted video signal and the modulated derived audio signal to provide a resultant signal; and receiving means for receiving and reproducing the video signal from the resultant signal provided by said receiver decoding means and for receiving and reproducing said audio signal from the resultant signal provided by said receiver decoding means in synchronism with said vidso signal.

13. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signal so as to induce distortion of the picture and for producing a key signal said transmitter encoding means including synch stripper means for removing each of the horizontal synch pulses of said video signal, pulse means controlled by the horizontal synch pulses removed by said synch stripper means for providing pulses of a predetermined duration and a predetermined amplitude, key signal producing means for producing a key signal under the control of the horizontal synch pulses removed by said synch stripper means, gating means for removing the front porch and horizontal synch pulse of each of the pedestals of said video signal, mixing means for superimposing pulses provided by said pulse means on said video signal in place of the removed front porches and horizontal synch pulses of the pedestals, inverting means for inverting the polarity of the video signal provided by said mixing means, and modulating means for varying the amplitudes of said pulses in accordance with a predetermined function;

receiver decoding means for receiving said video signal and for reinverting the polarity of said video signal and for reinserting horizontal synch signals so as to nullify the effect of said encoding means and provide an undistorted picture, said receiver decoding means comprising means for deriving said video signal and said audio signal and said key signal from the received signal, means for reinserting horizontal synch pulses under the control of said key signal, means for inverting said video signal to nullify the effect of said encoding means, means for modulating the derived inverted video signal on a video carrier, means for modulating the derived audio signal on an audio carrier, and means for combining the modulated derived inverted video signal and the modulated derived audio signal to provide a resultant signal; and receiving means for receiving and reproducing the video signal from the resultant signal provided by said receiver decoding means and for receiving and reproducing said audio signal from the resultant signal provided by said receiver decoding means in synchronism with said video signal.

14. In a television system, in combination, transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse and a determined back porch duration from the trailing edge of the horizontal synch pulse to the trailing edge of the corresponding pedestal, said transmitting means including transmitter audio means for simultaneously transmitting an audio signal of a frequency within the audible frequency range synchronized with said video signal;

transmitter encoding means for replacing the front porch and horizontal synch pulse of each of the pedestals of said video signal with a noise signal and for inverting the polarity of said video signals so as to induce distortion of the picture and for producing a key signal said transmitter encoding means including synch stripper means for removing each of the horizontal synch pulses of said video signal, pulse means controlled by the horizontal synch pulses removed by said synch stripper means for providing pulses of a predetermined duration and a predetermined amplitude, key signal producing means for producing a key signal under the control of the horizontal synch pulses removed by said synch stripper means, gating means for removing the front porch and horizontal synch pulse of each of the pedestals of said video signal, mixing means for superimposing pulses provided by said pulse means on said video signal in place of the removed front porches and horizontal synch pulses of the pedestals, inverting means for inverting the polarity of the video signal provided by said mixing means, and modulating means for varying the amplitudes of said pulses in accordance with a predetermined function;

receiver decoding means for receiving said video signal and for reinverting the polarity of said video signal and for reinserting horizontal synch signals so as to nullify the effect of said encoding means and provide an undistorted picture, said receiver decoding means comprising means for deriving said video signal and said audio signal and said key signal from the received signal, means for reinserting horizontal synch pulses under the control of said key signal, said last-mentioned means comprising locked oscillator means energized by said key signal, pulse generator means driven by said locked oscillator means for producing said horizontal synch pulses and means for reinserting the horizontal synch pulses produced by said pulse generator means in the derived video signal, means for inverting said video signal to nullify the effect of said encoding means, means for modulating the derived inverted video signal on a video carrier, means for modulating the derived audio signal on an audio carrier, and means for combining the modulated derived inverted video signal and the modulated derived audio signal to provide a resultant signal; and receiving means for receiving and reproducing the video signal from the resultant signal provided by said receiver decoding means and for reciving and reproducing said audio signal from the resultant signal provided by said receiver decoding means in synchronism with said video signal.

References Cited

UNITED STATES PATENTS

| | | | |
|---|---|---|---|
| 3,069,492 | 12/1962 | D'Agostini | 178—5.1 |
| 3,081,376 | 3/1963 | Loughlin | 178—5.1 |

ROBERT L. GRIFFIN, *Primary Examiner.*

HOWARD W. BRITTON, *Assistant Examiner.*